United States Patent [19]

Takahashi et al.

[11] Patent Number: 4,654,739
[45] Date of Patent: Mar. 31, 1987

[54] THIN FILM MAGNETIC HEAD FOR REPRODUCING PERPENDICULAR MAGNETIZATION

[75] Inventors: Ken Takahashi, Suita; Hiroshi Youda, Hirakata; Seishi Sasaki, Nishinomiya; Kenji Kanai, Neyagawa, all of Japan

[73] Assignee: Matsushita Electric Industrial Co., Ltd., Osaka, Japan

[21] Appl. No.: 687,932

[22] Filed: Dec. 31, 1984

[30] Foreign Application Priority Data

Jan. 5, 1984 [JP] Japan .................................. 59-455
Jan. 5, 1984 [JP] Japan .................................. 59-456

[51] Int. Cl.⁴ .............................................. G11B 5/22
[52] U.S. Cl. ............................................... 360/113
[58] Field of Search ................................... 360/113

[56] References Cited

FOREIGN PATENT DOCUMENTS 0102321 6/1983 Japan .................................. 360/113
0179928 10/1983 Japan ................................ 360/113
0179927 10/1983 Japan ................................ 360/113

Primary Examiner—Robert S. Tupper
Attorney, Agent, or Firm—Stevens, Davis, Miller & Mosher

[57] ABSTRACT

A thin film magnetic head for reproducing perpendicular magnetization comprising an operative surface disposed to face a recording medium, a thin film magnetization detection portion including a magneto-resistive element perpendicular to the operative surface of the head with one side edge of the magnetization detection portion being exposed to the operative surface, ferromagnetic material with one end thereof being magnetically coupled to the side edge portion of the thin film magnetization detection portion most distant from said operative surface and with the other end thereof being exposed to the operative surface, and a non-magnetic material disposed in an area defined by the thin film magnetization detection portion, the ferromagnetic material and the operative surface, wherein the distance between the thin film magnetization detection portion and the ferromagnetic material at said operative surface is at least five times the distance between the end of the ferromagnetic material magnetically coupled to the side edge portions of the thin film magnetization detection portion and the operative surface.

6 Claims, 8 Drawing Figures

THIN FILM MAGNETIC HEAD FOR REPRODUCING PERPENDICULAR MAGNETIZATION

BACKGROUND OF THE INVENTION

1. Field of the Invention

This invention relates to a magnetoresistive type thin film magnetic head which is suitable for reproducing signal recorded on a perpendicular magnetic recording medium.

2. Description of the Prior Art

It is known that perpendicular magnetic recording is inherently more suitable for high density recording than longitudinal magnetic recording. However, the former has been involved in various problems in the reproduction operation. For example, for the reproduction with a wire-wound magnetic head, there have been proposed single pole heads and ring heads. But when a ring head is used to reproduce short-wavelength signals that characterize the perpendicular recording, the head needs to have an extremely small gap length, resulting in a very low efficient magnetic circuit of the head. Moreover, if turns of winding are increased in order to enhance the sensitivity of reproduction, the self resonance frequency will fall due to the increased head inductance. On the other hand, the signal frequency rises with decrease in recording wavelength, and a fall in the self resonance frequency of the magnetic head is extremely disadvantageous in reproducing signals. A single pole head cannot avoid the same problems of the wire-wound magnetic head.

The more serious common problem of electromagnetic induction heads is a small reproduction output voltage when the recording medium is fed slow relative to the head, and thus increased turns of winding for counter-acting the matter. On the other hand, in a multiple track arrangement where several magnetic heads are aligned, the wiring space poses a problem. In addition, when the thin film technology is used to fabricate wire-wound magnetic heads, the number of turns of winding is restricted, and a high-sensitivity magnetic head cannot be achieved.

In order to overcome the aforementioned problems, attention is paid recently to a magnetic head utilizing the magneto-resistive effect hereinunder ("MR"). One example of the conventional MR head is of a single element type, in which a strip of magneto-resistive element is placed perpendicularly to the recording medium with a current conducted in the longitudinal direction of the element and the magnetic flux of the recording signal is incident on the element surface at right angles with respect to the longitudinal direction. This type of magneto-resistive head is known to have the structure-dependent wavelength response characteristics solely determined by the width W of the magneto-resistive element. In order for the magneto-resistive head to reduce the wavelength loss sufficiently, the element width W needs to be made as small as the recording wavelength $\lambda$, and this is extremely disadvantageous for a head designed to handle short wavelength signals.

On the other hand, there is known a shielded MR head in which a high permeability material is placed on both planes of the MR element. This type of MR head has substantially the same wavelength response characteristics as of the conventional wire-wound ring head, and is known to be operable sensitively down to a range of relatively short wavelengths. In this structure, however, the magnetical and electrical insulation is needed between the MR element and the high permeability material, and the thicknesses g1 and g2 of the insulation layers on both sides correspond to the gap length of the conventional wire-wound ring head. In addition, in order to sufficiently reduce the gap loss for short wavelengths, which is approximately the product of the gap loss of g1 and the gap loss of g2, both the g1 and g2 must be made extremely small. It is very difficult in such circumstances to form a small gap length without magnetical and electrical leakage.

SUMMARY OF THE INVENTION

Accordingly, it is an object of the invention to prevent the width loss of an MR element and the gap loss described above and to provide a thin film magnetic head which can reproduce perpendicular magnetization effectively in a shortwave range.

A thin film magnetic head according to the invention comprises (1) a thin film magnetic detecting element arranged substantially perpendicularly to a recording medium;

(2) a non-magnetic material arranged in contact with one end of the thin film magnetic detecting element which is opposed to the recording medium; and (3) a ferromagnetic material arranged such as to be magnetically connected to the other end of the thin film magnetic detecting element:

and it is characterized in that the length of the non-magnetic material on the travelling surface of the recording medium in the travelling direction of the recording medium is set to be not less than 5 times the distance between the ferromagnetic material and the travelling surface of the recording medium in the vicinity of the thin film magnetic detecting element.

According to the invention, a signal flux from high density recorded perpendicular magnetization can be efficiently reproduced by arranging a ferromagnetic material which leads the signal flux to high permeability layer of the medium in the vicinity of a thin film magnetic detecting element. In particular, by setting the length of the non-magnetic material on the travelling surface of the recording medium in the travelling direction thereof to be not less than 5 times the distance between the ferromagnetic material and the travelling surface of the recording medium in the vicinity of the thin film magnetic detecting element, the returned magnetic flux is prevented from concentrating on one portion of the ferromagnetic material, unevenness of recording density characteristics which is caused by interference of signal fluxes is eliminated and good recording density characteristics are obtained.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
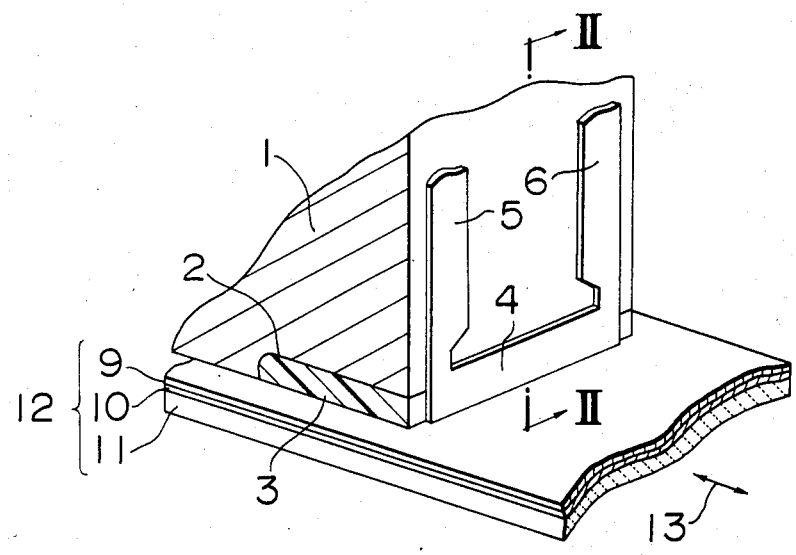
FIG. 1 is a perspective view of a first embodiment of a thin film magnetic head according to the invention.
Figure 2:
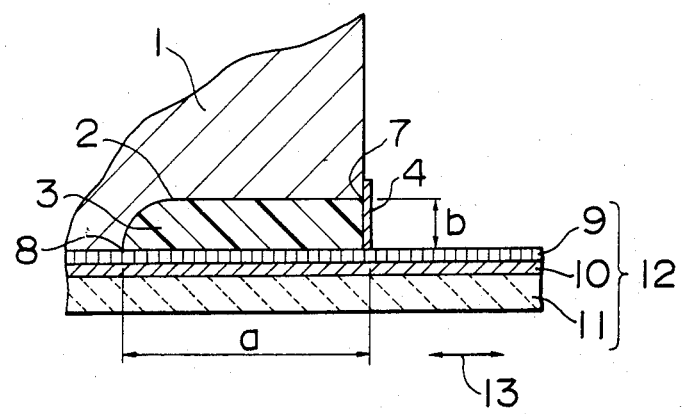
FIG. 2 is a sectional view of the first embodiment taken along the lines II—II of FIG. 1.

FIGS. 1 and 2 are perspective and sectional views, respectively, of a first embodiment of the present invention. As is shown in the drawings, at the end portion facing a recording medium 12 on the side surface of a ferromagnetic material 1 such as ferrite, a notch 2 is formed, which is filled with a non-magnetic material 3 such as to become level with the side surface of the ferromagnetic material 1. At this time the depth a of the notch 2 is set to be not less than 5 times the distance b between the ferromagnetic material 1 and the travelling surface of the recording medium 12 in the finished head. On the fresh side surface which has been finished in this way, Ni-Fe alloy, for example, is applied at a thickness of about 500Å by vapor deposition, and a thin film magnetic detecting element is formed by arranging electrodes 5, 6 at both longitudinal ends of an MR element 4 by the photo-etching method and arranging the MR element 4 in parallel to the longitudinal sides of the notch 2. The upper end portion of the MR element 4 is magnetically connected with the upper portion 7 of the notch 2 provided in the ferromagnetic material 1, and the lower portion of the MR element 4 is in contact with the recording medium 12. The recording medium 12 is composed of a perpendicular anisotropic film 9 of such as Co-Cr, a soft magnetic thin film 10 of permalloy or the like and a substrate 11. An arrow 13 shows the travelling direction of the recording medium 12.

Figure 3:
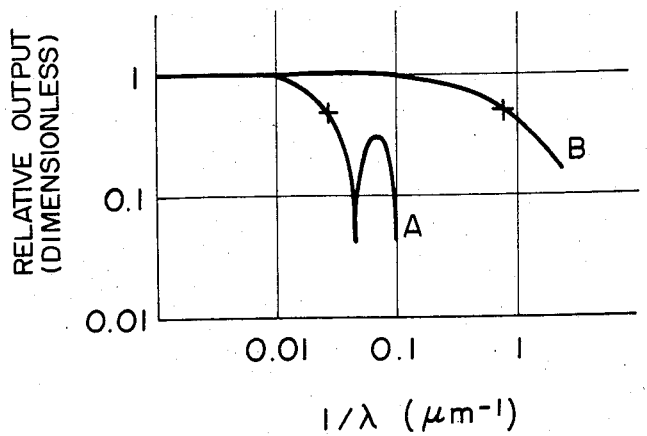
FIG. 3 shows the wavelength response characteristics of a thin film magnetic head according to the invention.
Figure 4:
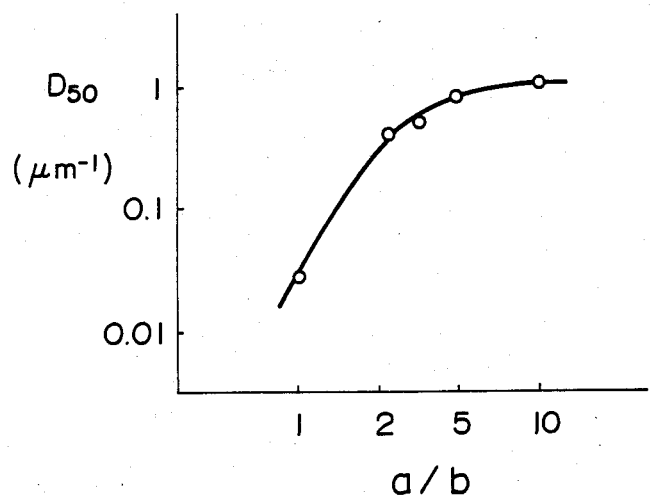
FIG. 4 is a characteristic curve showing the change of the value $D_{50}$ when the value a/b is varied.

In the above-described structure, the flux generating from the signal magnetization recorded on the perpendicular anisotropic film 9 is introduced from the lower portion of the MR element 4, and flows through the MR element 4 the upper portion thereof and the upper portion 7 of the notch 2 provided in the ferromagnetic material 1, and flows into the ferromagnetic material 1 to be guided by the soft magnetic thin film 10 of the recording medium 12, which extensively faces the perpendicular anisotropic film 9, to be returned to signal magnetization. It was found that if the length a of the non-magnetic material 3 is too short as compared with the distance b, the signal flux which has flowed into the ferromagnetic material 1 concentrates on the end portion 8 of the ferromagnetic material 1, which disadvantageously produces an interference phenomenon similar to gap action in a ring head, and causes a dip phenomenon in the vicinity where the recording wavelength is a or an integral multiple of a. This dip phenomenon reduces the recording density ($D_{50}$) which should be half the output level of the low density region. FIG. 3 shows the wavelength response characteristics, in which the abscissa denotes the reciprocal number of the wavelength $\lambda$, in other words, it corresponds to a frequency, and the ordinate denotes relative output. The curve (A) which shows the characteristics when a/b=1 tells us that a dip phenomenon is generated in the neighborhood of the wavelength of a divided by integral multiple. Therefore, the recording density $D_{50}$ (marked with +) is decreased considerably. The curve (B) shows the characteristics obtained when a/b=5. A dip phenomenon is not seen even in the high density region, and $D_{50}$ is greatly increased. In FIG. 4, the value b is fixed and a is varied. It tells us that with the increase of a/b the density characteristic $D_{50}$ is heightened. The results are the same when the value a is fixed and b is varied. We found from our experiments that if a is not less than five times b, unevenness of recording density characteristics is eliminated and a perpendicular thin magnetic film of good density characteristics is obtained. In addition, it has been found that the reproduction efficiency is little varied even when the value a becomes large with the value b fixed. This is because the ferromagnetic material 1 and the soft magnetic film 10 of the recording medium 12 are opposed to each other over a large area through the non-magnetic material 3, and most fluxes flow into the soft magnetic film 10 of the recording medium 12 through this non-magnetic material 3. As a result, the width loss in a single element type MR element and the gap loss in a shielded type MR head which have been the problems in the prior art are eliminated, and a perpendicular magnetic reproducing head is obtained which is efficient in high density characteristics and which can realize good recording density characteristics without unevenness. As described above, since this head is produced by forming the notch 2 on the ferromagnetic material 1, filling the notch 2 with the non-magnetic material 3 and forming a thin film magnetic detection element thereon by photoetching, production is easy and is very suitable for mass production by utilizing thin-film techniques.

Figure 5:
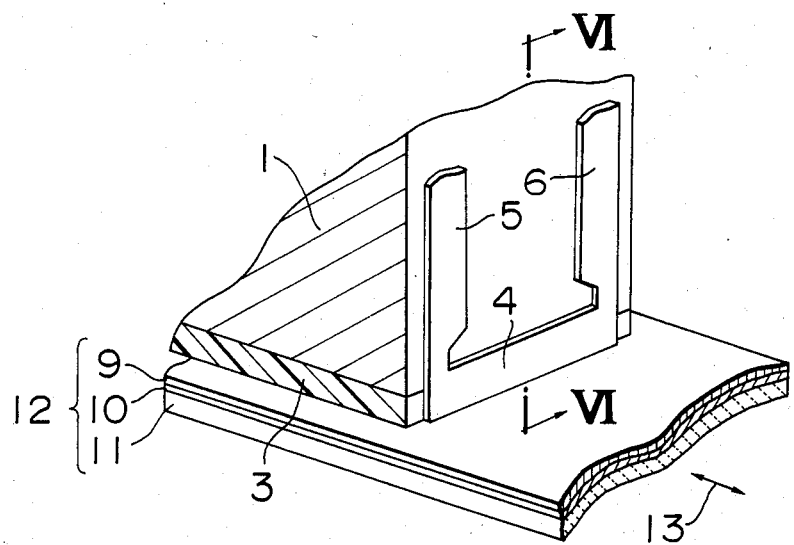
FIG. 5 is a perspective view of a second embodiment of a thin film magnetic head according to the invention.
Figure 6:
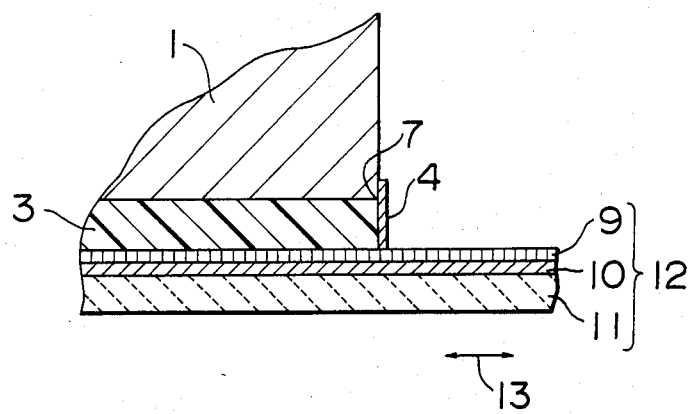
FIG. 6 is a sectional view of the second embodiment taken along the lines VI—VI of FIG. 5.

FIGS. 5, 6 are perspective and sectional views, respectively, according to a second embodiment of the invention. As is shown in the Figures, after the non-magnetic material 3 such as glass or ceramic is bonded to, or subjected to thin-film formation on, the ferromagnetic material 1, one side of the ferromagnetic material 1 is finished by mirror polishing. Thereon, a thin film magnetic detecting element is formed in the same way as the embodiment shown in FIG. 1. This embodiment is different from the first embodiment in FIG. 1 only in that b is extremely large, and therefore, quite like the first embodiment in the reproducing operation, it is possible to realize, a thin film magnetic head for reproduction of perpendicular magnetization without unevenness in wavelength response characteristics and with good density characteristics. In the second embodiment of the above-described structure, by bonding the ferromagnetic material 1 and the non-magnetic material 3 which is efficient in wear resistance with glass or the like so as to make a head substrate, a thin film magnetic head without partial wear and suitable for practical use is realized.

Figure 7:
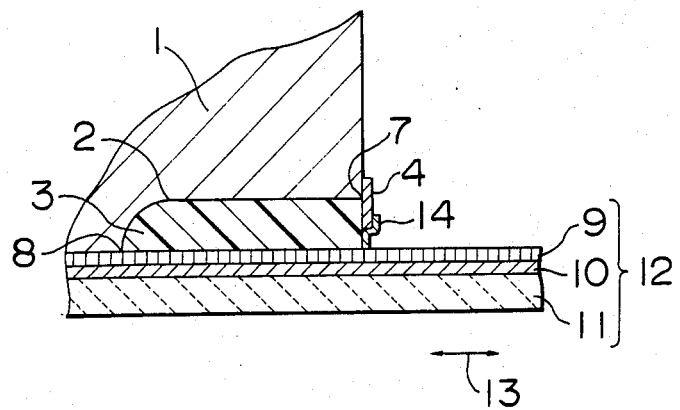
FIG. 7 is a perspective view of a third embodiment of a thin film magnetic head according to the invention.

FIG. 7 is a cross sectional view of a third embodiment of the invention. Unlike the first embodiment in which the thin film magnetic detecting element is composed of a single MR element 4, the thin film magnetic detecting element in this embodiment is composed of the MR element 4 the upper position of which is magnetically connected to the upper end portion 7 of the notch 2 of the ferromagnetic material 1; and a ferromagnetic material 14 the upper end portion of which is magnetically connected with the lower end portion of the MR element 4 through an electrical insulator; the lower end portion of the ferromagnetic material 14 being in contact with the recording medium 12. As an electrical insulator, an insulating film such as SiO or $SiO_2$ is used.

This structure can prevent the current flowing through the MR element 4 from leaking to the recording medium when a recording medium of good conductivity such as Co-Cr is used.

Figure 8:
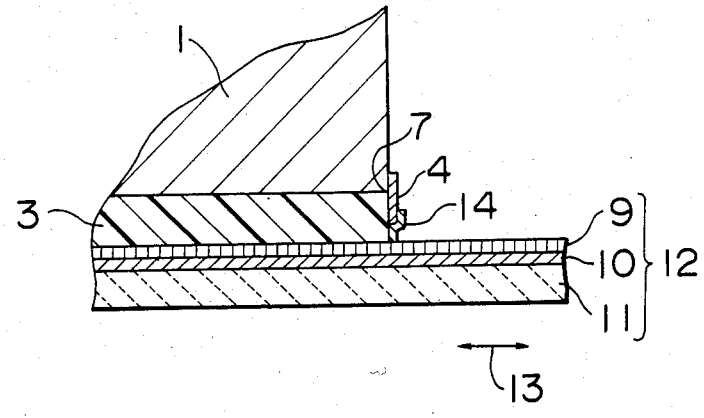
FIG. 8 is a sectional view of a fourth embodiment of a thin film magnetic head according to the invention.

Referring to FIG. 8 which is a cross sectional view of a fourth embodiment of the invention, it is the same as the second embodiment except that the thin film magnetic detecting element which is composed of a single MR element 4 in the second embodiment has the same structure as that of the third embodiment. Therefore, this embodiment can bring about the same effects as the third embodiment. The ferromagnetic material 14 is preferably a magnetic material of high permeability and high saturation flux density and a material efficient in wear resistance and corrosion resistance. The use of an amorphous magnetic material, which meets the conditions described above, can realize a perpendicular magnetic reproducing head of high efficiency.

Additionally, by arranging the ferromagnetic materials on both sides of the thin film magnetic detecting element, which arrangement is not shown in the drawings, a thin film magnetic head resistant to noise induced from the outside can be realized and also reproduction efficiency is heightened.

As described above, a thin film magnetic head is free from the width loss of an element in a single element type MR element or the gap loss in a shielded type MR element in the prior art. Accordingly, perpendicular magnetization of high density can be reproduced with little loss and high efficiency, and unevenness of recording density characteristics caused by interference of a signal flux is eliminated, whereby good recording density characteristics are obtained. In addition, since even low relative speed between a head and a medium can obtain sufficient reproduction output and head inductance is small, it is advantageous in the handling of the circuit and suitable for a multitrack construction which will be realized in the near future. Furthermore, the simple structure facilitates mass production of reproduction heads of high sensitivity.

While there have been described what are at present considered to be preferred embodiments of the invention, it will be understood that various modifications may be made therein, and it is intended that the appended claims cover all such modifications as fall within the true spirit and scope of the invention.

What is claimed is:

1. A thin film magnetic head for reproducing perpendicular magnetization comprising:

an operative surface disposed to face a recording medium;

a thin film magnetization detection portion including a magneto-resistive element perpendicular to the operative surface of the head with one side edge of the magnetization detection portion being exposed to the operative surface;

a ferromagnetic material with one end thereof being magnetically coupled to the side edge portion of the thin film magnetization detection portion most distant from said operative surface and with the other end thereof being exposed to the operative surface; and a non-magnetic material disposed in an area defined by the thin film magnetization detection portion, the ferromagnetic material and the operative surface;

wherein the distance between the thin film magnetization detection portion and the ferromagnetic material at said operative surface is at least five times the distance between the end of the ferromagnetic material magnetically coupled to the side edge portion of the thin film magnetization detection portion and the operative surface.

2. A thin film magnetic head for reproducing perpendicular magnetization according to claim 1, wherein the non-magnetic material is fitted into a notch extending from the surface forming the thin film magnetization detection portion to the operative surface.

3. A thin film magnetic head for reproducing perpendicular magnetization according to claim 1, wherein the non-magnetic material is applied to the entire operative surface of the ferromagnetic material facing the recording medium.

4. A thin film magnetic head for reproducing perpendicular magnetization according to any one of claims 1 to 3, wherein the thin film magnetization detection portion is composed of a thin film magneto-resistive element consisting of a ferromagnetic material.

5. A thin film magnetic head for reproducing perpendicular magnetization according to claim 1, wherein the thin film magnetization detection portion comprises a thin film magneto-resistive element formed of a ferromagnetic material having one end thereof magnetically coupled to the ferromagnetic material, and a ferromagnetic thin film having one end thereof magnetically coupled to the thin film magneto-resistive effect element through an electrical insulator and the other end thereof exposed to the operative surface.

6. A thin film magnetic head for reproducing perpendicular magnetization according to claim 5, wherein the ferromagnetic thin film is composed of an amorphous magnetic material.

* * * * *